United States Patent [19]

Tanaami et al.

[11] 4,390,501
[45] Jun. 28, 1983

[54] HIGH TEMPERATURE GAS DISTRIBUTOR FOR FLUIDIZED BED

[75] Inventors: Kazuo Tanaami, Ebina; Nobuo Matsuda, Kamakura, both of Japan

[73] Assignee: Director-General, Agency of Industrial Science & Technology, Tokyo, Japan

[21] Appl. No.: 237,942

[22] Filed: Feb. 25, 1981

[30] Foreign Application Priority Data

Apr. 9, 1980 [JP] Japan ............................... 55-45619

[51] Int. Cl.³ ............................................ F27B 15/10
[52] U.S. Cl. ...................................... 422/143; 48/77; 48/87; 34/57 R; 432/58
[58] Field of Search .................. 422/143; 48/87, 77, 48/62 R; 126/163 R, 163 A, 152 R; 110/323, 336, 182.5, 338, 310, 245; 165/9.1, 9.3; 432/58; 34/57 R, 57 A; 52/198, 303, 245, 602

[56] References Cited

U.S. PATENT DOCUMENTS

| | | | |
|---|---|---|---|
| 1,766,283 | 6/1930 | Danforth, Jr. et al. | 165/9.1 |
| 2,176,157 | 10/1939 | Tanner | 165/9.1 |
| 3,220,367 | 11/1965 | Stein | 52/245 |
| 3,792,960 | 2/1974 | Gion | 432/58 |
| 4,073,064 | 2/1978 | Steever et al. | 34/57 A |

OTHER PUBLICATIONS

G. G. Hawley, "The Condensed Chemical Dictionary", 8th Edition, 1974, p. 956.

*Primary Examiner*—William F. Smith
*Attorney, Agent, or Firm*—Frishauf, Holtz, Goodman & Woodward

[57] ABSTRACT

A high temperature (1000° C. or higher) gas distributor for a fluidized bed, which comprises a pair of refractory supporting bricks which are each provided with grooves at given intervals and which are positioned with a space therebetween in such a manner that the grooves face each other; plates made of electrocast zirconia brick, both ends of which are inserted into the respective grooves of opposing supporting bricks and are secured therein by mortar; and refractory holding bricks for holding the refractory supporting bricks and the ends of the plates in relative position.

5 Claims, 11 Drawing Figures

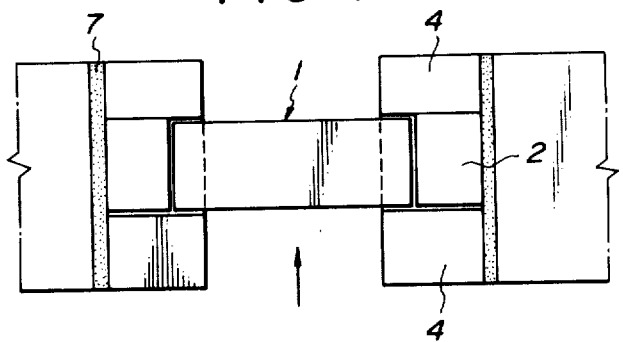
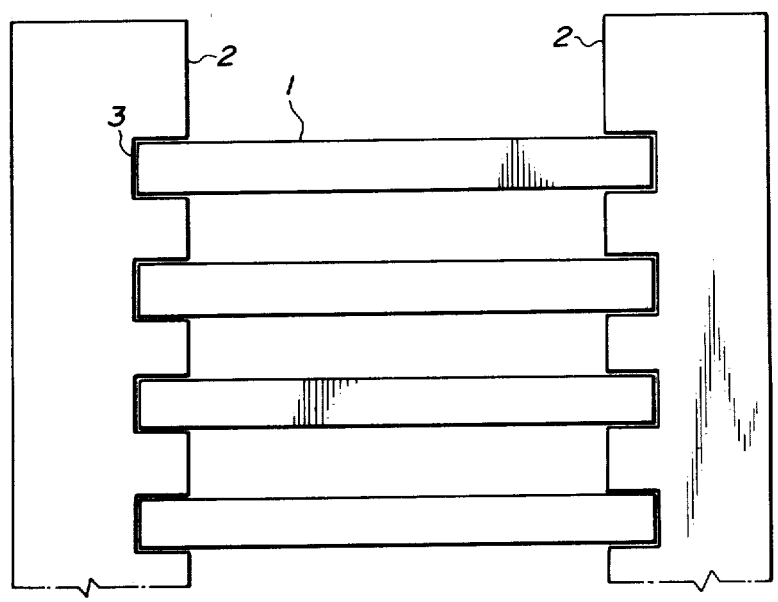

FIG. 5
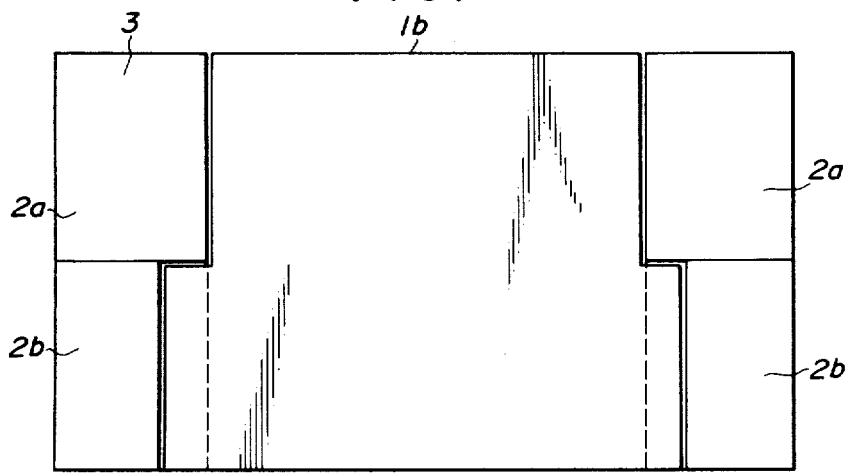
FIG. 6
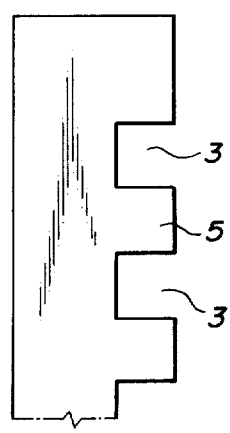
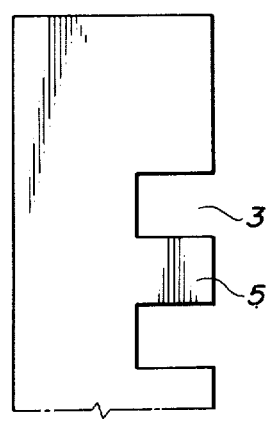

HIGH TEMPERATURE GAS DISTRIBUTOR FOR FLUIDIZED BED

BACKGROUND OF THE INVENTION

This invention relates to a high temperature gas distributor for a fluidized bed and particularly to a gas distributor for use in introduction of high temperature (higher than 1000° C., particularly about 1700° C. to 2400° C.) gas into a reactor from the bottom or side wall thereof, where solid particles are fluidized by gas.

In a reactor in which solid particles are fluidized by gas, it is desirable to provide a gas distributor in an inlet portion through which the gas is introduced, so that particles may be mixed as uniformly as possible and be brought into good contact with gas. For example, U.S. Pat. No. 3,661,543 discloses a system in which a plate grid is placed at the bottom of a gasification vessel in order to disperse gas uniformly.

Where the temperature of the system is below about 1000° C., it is possible to use a gas distributor made of a metal material. However, when it is higher than about 1000° C., it is not possible to use such metal materials. Therefore, in the case of a system wherein the temperature is higher than about 1000° C., oxide-based refractory materials are generally used. For example, the bottom portion has been filled with oxide-based refractory beads for the gas distributor. With this method, however, no sufficient effect has been obtained because, in some cases, such beads are blown up or pushed to one side in the fluidized bed.

SUMMARY OF THE INVENTION

It is an object of this invention to remove the above described defects of the prior art and to provide a gas distributor which can be used for introduction of gas having a high temperature of about 1,000° C. or higher, particularly about 1,700° C. to 2,400° C., into a reactor.

We have found that the above object can be attained by using a gas distributor of the plate grid type which is prepared using a refractory brick, an electrocasting brick or a plate cut off therefrom.

BRIEF DESCRIPTION OF THE DRAWINGS

FIG. 1 is a side view of a gas distributor of this invention;

FIG. 2 is a plan view, on a different scale, of the distributor of FIG. 1;

FIG. 5 is a cross sectional view, taken along the line B—B' of FIG. 3;

FIGS. 6(I) and 6(II) are each an explanation view of a refractory supporting brick;

DETAILED DESCRIPTION OF THE INVENTION

Figure 11:
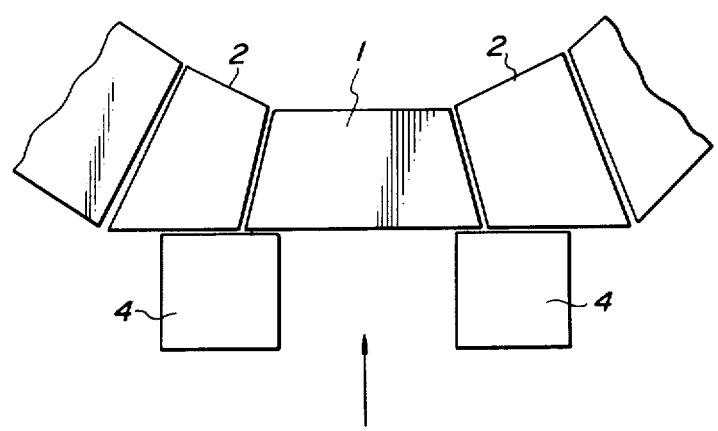
FIG. 11 is a side view of a further gas distributor of this invention. Here six kinds of gas distributors are disclosed.

The basic structure of a gas distributor of this invention is shown in FIGS. 1 and 2, or FIGS. 11 and 2. In the FIG. 1 and 2 embodiment of this invention, the gas distributor comprises a pair of refractory supporting bricks 2 which are each provided with grooves 3 at given intervals. Bricks 2 are positioned with a space therebetween in such a manner that the grooves of the two supporting bricks face to each other. Plates 1 made by electrocasting brick (hereinafter designated as "plate") are placed in such a manner that the both ends thereof are inserted into the grooves 3 and are secured therein by the ue of mortar. Refractory holding bricks 4 are provided to hold the refractory supporting bricks 2 and the ends of the plates 1 in relative position. As shown in FIGS. 11, by making the plates 1 trapezoidal, and slanting or tapering a contacting side of the refractory supporting bricks 2, the end of the plate 1 at the downstream side in the gas flow are supported by the slanting surfaces of the supporting bricks 2 both ends of the plates and the refractory supporting bricks 2 at upstream the side in the gas flow are mutually held in place by the refractory holding bricks 4.

Figure 3:
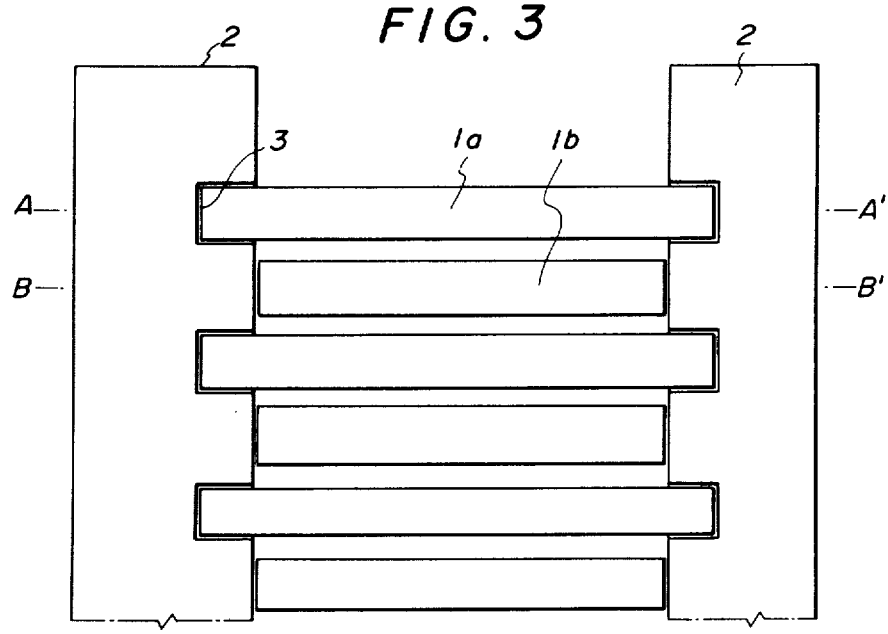
FIG. 3 is a plan view of a modified embodiment of the invention.
Figure 7:
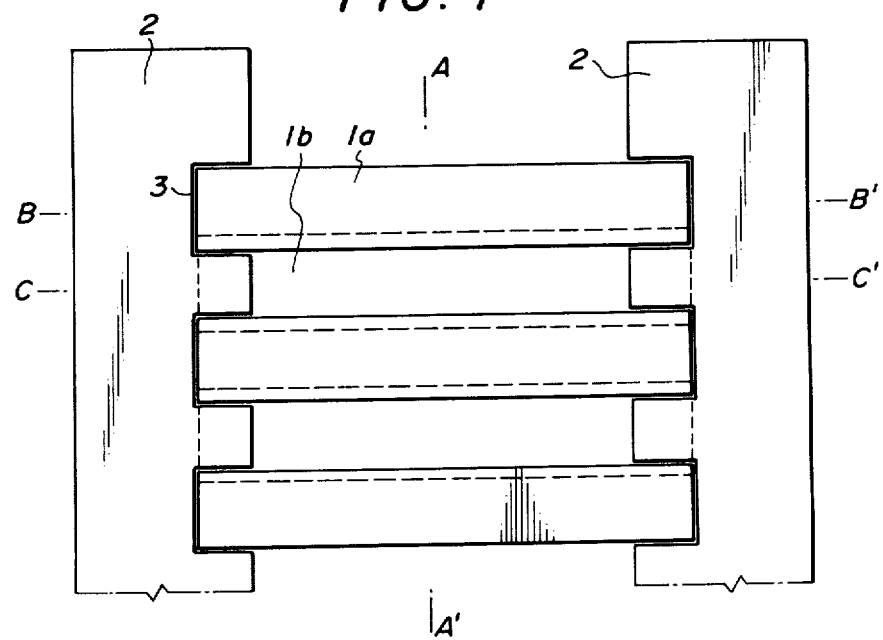
FIG. 7 is a plan view of another embodiment of the invention.

FIGS. 3 and 7 show further embodiment of the gas distributor of this invention, which are improvements over the above described gas distributor.

Figure 4:
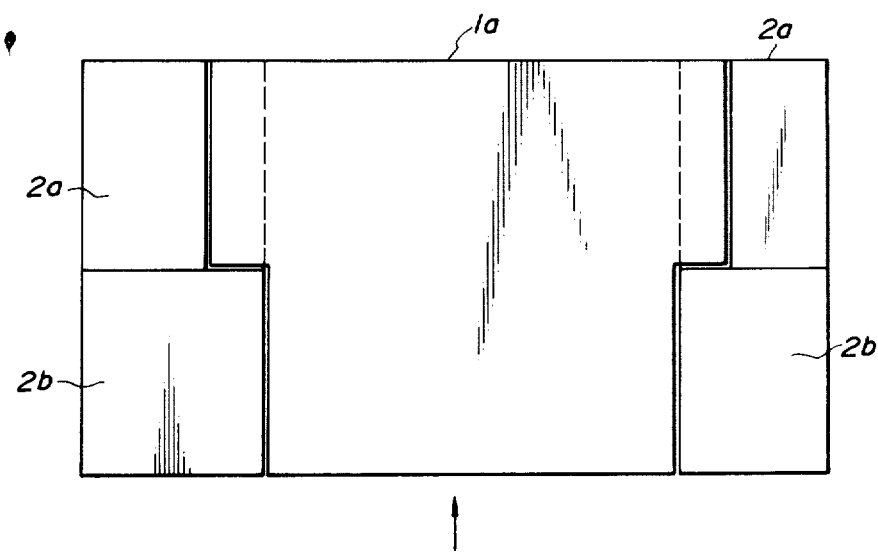
FIG. 4 is a cross sectional view, taken along the line A—A' of FIG. 3.

This improved gas distributor of FIG. 3 comprises one pair of refractory supporting bricks 2a which are each provided with grooves 3 at certain intervals; another pair of refractory supporting bricks 2b which are each provided with grooves 3 at certain intervals in such a manner that they register with the portions between the grooves of the first mentioned refractory supporting bricks 2a, these two pairs of refractory supporting bricks being positioned with a space therebetween in such a manner that the grooves face each other (FIGS. 4, 5). A plurality of convex-shaped plates 1a and reverse convex-shaped plates 1b are alternately placed between the above two pairs of refractory supporting bricks in such a manner that the both ends of each plate are inserted into a groove and secured therein by the use of mortar. Refractory holding bricks are provided to hold the above two kinds of refractory supporting bricks 2a, 2b and the ends of the above two kinds of plates 1a, 1b in relative position. As shown in FIG. 11, by making the plates 1a, 1b generally trapezoidal, and slanting or tapering a contacting side of the associated refractory supporting bricks 2a, 2b, the end of the plates at the down stream side in the gas flow are supported by the refractory supporting bricks 4 and both ends of the plates and the refractory supporting bricks at the upstream side are mutually held in place by the refractory holding bricks 4.

In still another embodiment of this invention, FIG. 7 the gas distributor comprises one pair of refractory supporting bricks 2b which are each provided with grooves at given intervals and which are positioned with a space therebetween in such a manner that the grooves of the refractory supporting bricks 2b face each other; additional refractory bricks 6 superposed on the above refractory supporting bricks 2b; another pair of refractory supporting bricks 2a which are each provided with grooves at given intervals in such a manner that they register with the portions between the grooves of the above refractory supporting bricks 2b, and which are superposed on the above mentioned additional pair of refractory bricks 6; a plurality of plates 1a, 1b which are placed in such a manner that they are alternately inserted into the grooves of the above two types of refractory supporting bricks 2a, 2b and which are secured therein by the use of mortar; and refractory holding bricks 4 for holding in relative position the two pairs of refractory supporting bricks and the ends of the above plates. As shown in FIG. 11, by making the plates generally trapezoidal, and slanting or tapering a contacting side of the associated refractory supporting brick, the end of the plates at the downstream side in the gas flow are supported by the refractory supporting bricks and only both ends of the plates and the refractory supporting bricks at the upstream side need be supported by the refractory holding bricks.

As illustrated in FIGS. 1 and 2, the plates 1 are disposed at given intervals in such a manner that they are in parallel to the direction in which the gas flows (indicated by an arrow in FIG. 1), and both ends of each plate are inserted into respective grooves 3 of the refractory supporting brick 2 and secured therein with mortar.

Mortar which can be used includes zirconia mortar. This mortar not only secures the plates 1, but also acts to absorb heat-expansion of the plates 1 owing to a high temperature gas. Refractory bricks 4 are placed both at the upstream side in the gas flow and at the downstream side in the gas flow, to hold in position the gas distribution plates 1 and to secure them.

In the embodiment as shown in FIG. 11, the plate 1 and the refractory supporting brick 2 are supported and secured to each other by an arch. That is, by tapering or slanting the surface where both the plates 1 and the refractory supporting bricks 2 come into contact with each other, they are supported relative to each at one side and the refractory holding bricks 4 are placed only at the upstream side in the gas flow (direction of arrow in FIG. 11).

In the gas distributor as shown in FIG. 3, the structure of the plates is different from that as shown in FIG. 2. That is, two kinds of plates are used, one of which is a reverse convex-shaped plate 1a as shown in FIG. 4 wherein both lower sides are cut away, and the other is a convex-shaped plate 1b as shown in FIG. 5 wherein both upper sides are cut away. Corresponding to the plates 1a and 1b, there are two kinds of grooved refractory supporting bricks 2a, 2b (FIGS. 4 and 5). One kind of refractory supporting brick should be superposed on the other.

Both upper half portions of the plate 1a are inserted into the grooves of the first refractory supporting bricks 2a and secured therein by the use of mortar. Both lower half portions of the plate 1a are secured by the refractory supporting brick 2b. On the other hand, both lower half portions of the plate 1b are inserted into the grooves of the second refractory supporting bricks 2b and secured therein by the use of mortar. Both upper half portions of the plate 1b are secured by the refractory supporting brick 2a. Furthermore, as illustrated in FIG. 1, refractory holding bricks 4 are disposed at both the upstream side and the downstream side in the gas flow to thereby hold in position and secure the gas distribution plates. Alternatively, as illustrated in FIG. 11, refractory holding bricks 4 are placed only at the upstream side in the gas flow and no holding bricks 4 are placed at the downstream side, since they are supported and secured on the downstream side by the arch as described hereinbefore.

The grooves 3 of the refractory supporting bricks 2a and 2b are provided in such a manner that as illustrated in FIG. 6 (I) and (II), the groove 3 of one refractory supporting brick is present at the position which matches with the convex portion 5 between the grooves 3 and 3 of the other refractory supporting brick. Therefore, when the plates 1a and 1b are placed alternately, gas distribution plates are formed at equal intervals. Furthermore, in this case, it is possible to greatly narrow the distance between the plate 1a and the plate 1b, for example, to about 0.2 millimeter.

Figure 8:
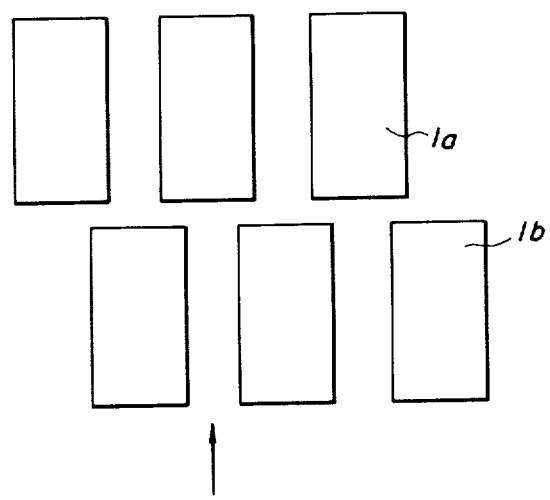
FIG. 8 is a cross sectional view, taken along the line A—A' of FIG. 7.

The gas distributor as shown in FIGS. 7 and 8 has a gas distribution plate whose construction is different from those of the above described two types of gas distributors. In FIG. 7, plates 1a and 1b are disposed at two stages to form a gas distribution plate. In this case, as best seen in FIG. 8 the gas flow is different from those of the above gas distributor; that is, the gas goes up (in the direction of the arrow in FIG. 8) through the clearance between the adjacent lower plates 1b, hits the bottom of the upper plates 1a, turns in the lateral direction, and then goes up through the clearance between the adjacent upper plates 1a.

Figure 9:
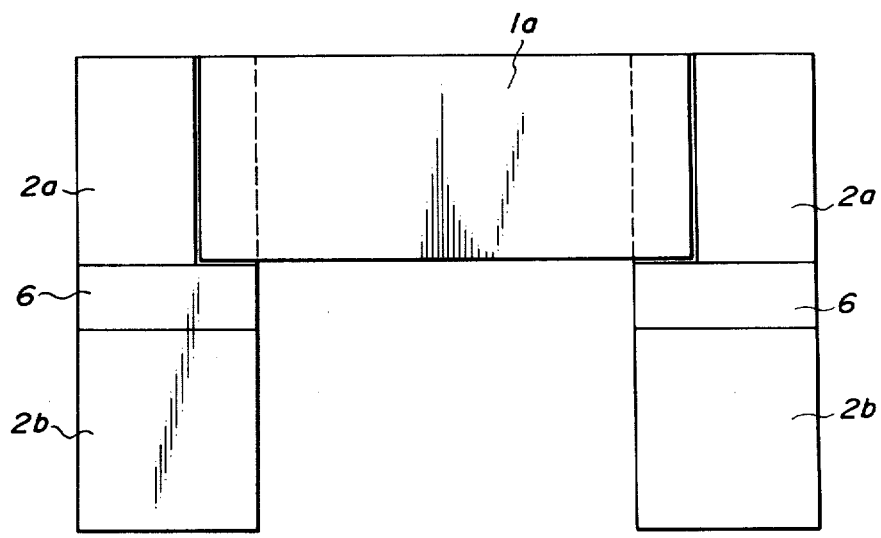
FIG. 9 is a cross sectional view, taken along the line B—B' of FIG. 7.
Figure 10:
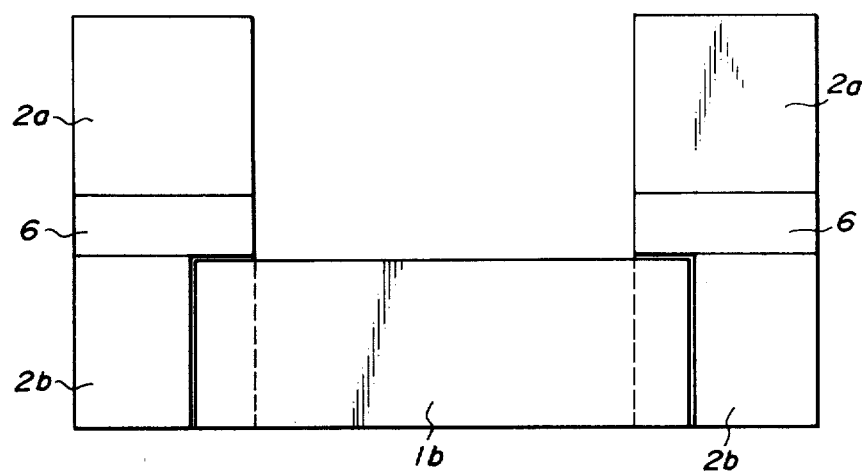
FIG. 10 is a cross sectional view, taken along the line C—C' of FIG. 7.

The structure of the gas distribution plates of FIGS. 7 and 8 will be explained with respect to FIGS. 9 and 10.

A pair of refractory supporting bricks 2a is placed with a space therebetween in such a manner that their grooves face each other, and both ends of the plate 1a are inserted into the opposing grooves and secured therein by the use of mortar. With the second refractory supporting bricks 2b, both ends of the plate 1b are inserted into the grooves thereof and secured therein by the use of mortar. The refractory supporting bricks 2a and 2b are superposed on each other through respective refractory bricks 6. In this case, the grooves of the refractory supporting bricks 2a and 2b are provided in such a manner that they have the same relation as described above, as illustrated in FIGS. 6(I) and (II). Therefore, when the refractory supporting bricks 2a and 2b secured with the plates 1a and 1b thereto respectively are superposed on each other, a gas distributor having the construction as shown in FIG. 8 is formed.

The gas distributor of this invention is provided at a lower or side portion of a fluidized bed in order to distribute high temperature gas of about 1,000° C. or higher, particularly about 1,700° C. to 2,400° C., which is to be introduced into the fluidized bed. The material for use in production of the gas distributor of this invention is required to be of high heat resistance and to be durable to abrasion caused by contact with fluidizing particles in the gas flow having a rate of about 10 to 100 meters per second.

In view of these circumstances, various studies on materials which are suitable for use in this invention have been made, and it has been found that electrocast zirconia bricks are preferred.

No gas distributor which can be used within the above described high temperature range has heretofore been produced using zirconia bricks because it is poor in abrasion resistance although it has excellent heat resistance.

In view of the fact that electrocast zirconia bricks have the above described properties although their moldability is poor, it has been succeeded in producing the desired gas distributor using electrocast zirconia bricks and plates made therefrom. As representative examples of electrocast zirconia bricks, there can be mentioned those bricks having a composition 93.8% of $ZrO_2$ and 3.1% of $SiO_2$ (TMZ, produced by Toshiba Monoflux Co., Ltd.) and so forth. Depending upon the temperature of the gas to be introduced into the fluidized bed, other refractory bricks and electrocast bricks can be used.

Such electrocast zirconia bricks are poor in moldability and heat impact resistance although they have excellent mechanical strength at high temperature and abrasion resistance. In view of these circumstances, the gas distribution plates of this invention are in the form of simple plates having a small thickness. It is preferred that the thickness of the plates be from 5 to 50 millimeters, the length be from 100 to 1,000 millimeters, and the width be from 50 to 300 millimeters. Furthermore, it is preferred that the distance between the plates, with the plates placed in parallel with each other, is from 0.2 to 10 millimeters. With regard to the refractory supporting bricks 2, refractory holding bricks 4 and so forth, suitable dimensions can be selected taking into consideration the size, strength, etc. of the gas distributor.

In the case of the gas distributor as shown in FIG. 2, if the distance between the gas distribution plates 1 is not adjusted to a suitable one, particles may drop or flow backward when the amount of the flowing gas is reduced during operation. However, with the gas distributors as shown in FIGS. 3 and 7 (FIG. 8), such troubles can be removed. With the gas distributor as shown in FIG. 7 (FIG. 8), it is necessary that the width of the gas flow path formed between the bottom surface of the plates 1a and the upper surface of the plates 1b should be smaller than the width calculated by the angle of repose of particles.

With any of the gas distributors as described above, it is necessary to minimize the temperature distribution in the gas distribution plates by reducing the thickness of the gas distribution plates so that they can withstand abrupt heat impact. The stress caused by the difference in temperature between the plates can be absorbed by the mortar which secures the plates.

Using a gas distributor having the structure as shown in FIG. 3 (dimension of plate: length 200 millimeters, width 30 to 80 millimeters and thickness 5 millimeters; and distance between plates, 0.9 millimeter), a 1,700° C. gas prepared by mixing and burning 83 $Nm^3/hr$ of oxygen, 84 $Nm^3/hr$ of hydrogen and 300 Kg/hr of steam (800° C.) by the use of a burner was introduced into a fluidized bed reactor from the bottom portion thereof to fluidize alumina particles having a diameter of about 0.9 millimeter. Under these conditions, the operation was continued for 15 days, and the contact between the fluid gas and particles was good. At the end of the period, there is no abnormality with the gas distributor. Even though the flow of gas was stopped, no dropping of particles or backward flow was observed.

The gas distributor of this invention is used connection with in a fluidized bed where a heat absorption reaction occurs, and is particularly suitable for use with a fluidized bed where cracking of heavy oil, gasification of coal, gasification of tar sand, or the like is carried out.

We claim:

1. A high temperaature gas distributor for a fluidized bed, which comprises:

a first pair of electrocast zirconia refractory supporting bricks (2a) each having a plurality of spaced elongated substantially straight grooves (3) formed therein at given intervals, said first pair of refractory supporting bricks (2a) being positioned with a space therebetween and with said grooves (3) of each said supporting brick facing each other, said first pair of refractory supporting bricks having opposing sides;

a second pair of electrocast zirconia refractory supporting bricks (2b) each having a plurality of spaced elongated substantially straight grooves therein at given intervals, said grooves of said second pair of refractory supporting bricks (2b) being positioned so as to register with portions between the grooves of said first pair of refractory supporting bricks (2a), said second pair of refractory supporting bricks (2b) being positioned with a space therebetween and with said grooves thereof facing each other;

a first plurality of substantially flat generally T-shaped electrocast zirconia brick plates (1a) arranged between said first pair of supporting bricks (2a), a cross portion of each of said first plurality of generally T-shaped plates having substantially straight opposed ends inserted into respective substantially straight grooves (3) of said first pair of supporting bricks (2a), said opposed ends of said cross portions of said first plurality of generally T-shaped plates being secured in said grooves of said first pair of supporting bricks (2a) by mortar;

a second plurality of substantially flat generally T-shaped electrocast zirconia brick plates (1b) of reverse shape relative to said first plurality of generally T-shaped electrocast zirconia brick plates (1a), said second plurality of generally T-shaped plates (1b) being arranged between said second pair of supporting bricks (2b), a cross portion of each of said second plurality of generally T-shaped plats having substantially straight opposed ends inserted into respective substantially straight grooves (3) of said second pair of supporting bricks (2b), said opposed ends of said cross portions of said second plurality of generally T-shaped plates being secured in said grooves of said second pair of supporting bricks (2b) by mortar;

said first and second pluralities of plates (1a, 1b) being alternately arranged adjacent and spaced from each other such that both ends of the cross portion of said T-shaped plates are inserted into respective grooves of respective refractory supporting bricks, the leg portions of said generally T-shaped plates being interposed between the cross portions of the adjacent generally T-shaped plates to provide respective gas flow paths between alternately adjacent, spaced, generally T-shaped first and second plates; and refractory holding bricks (4) arranged at at least one side of said at least one pair of said first and second pairs of refractory supporting bricks and adjacent at least one end of said plates in the grooves thereof for holding said refractory supporting bricks and the ends of said plates in relative position.

2. The gas distributor of claim 1, wherein the distance between adjacent ones of said T-shaped plates is from about 0.2 to about 10 millimeters.

3. The gas distributor of claim 1, wherein the sides of each plate which are inserted in said grooves is slanted, whereby said plates at the downstream side of said supporting bricks in the direction of gas flow are supported by the refractory supporting bricks in contact with said slanted sides; and said holding bricks are arranged on the upstream side of said supporting bricks for holding said plates and said supporting bricks in relative position.

4. A high temperature gas distributor for a fluidized bed, which comprises:

a first pair of electrocast zirconia refractory supporting bricks (2a) each having a plurality of spaced elongated substantially straight grooves (3) formed therein at given intervals, said first pair of refractory supporting bricks (2a) being positioned with a space therebetween and with said grooves (3) of each said supporting brick facing each other, said first pair of refractory supporting bricks having opposing sides;

a second pair of electrocast zirconia refractory supporting bricks (2b) adjacent said first pair of refractory supporting bricks, each of said second pair of refractory supporting bricks having a plurality of spaced elongated substantially straight grooves therein at given intervals, said grooves of said second pair of refractory supporting brocks (2b) being positioned so as to register with portions between the grooves of said first pair of refractory supporting bricks (2a), said second pair of refractory supporting bricks (2b) being positioned with a space therebetween and with said grooves thereof facing each other;

a first plurality of spaced apart substantially flat electrocast zirconia brick plates (1a) arranged one above the other between said first pair of supporting bricks (2a) and having substantially straight opposed ends inserted into respective substantially straight grooves (3) of said first pair of supporting bricks (2a), said opposed ends of said first plurality of plates being secured in said grooves of said first pair of supporting bricks (2a) by mortar;

a second plurality of spaced apart substantially flat electrocast zirconia brick plates (1b) arranged one above the other between said second pair of supporting bricks (2b) and having substantially straight opposed ends inserted into respective substantially straight grooves (3) of said second pair of supporting bricks (2b), said opposed ends of said second plurality of plates being secured in said grooves of said second pair of supporting bricks (2b) by mortar;

the spaces between adjacent ones of said plates defining a gas flow path;

said first plurality of plates not being coextensive with said second plurality of plates, said supporting bricks supporting said plates such that there is a spacing between ends of said first plates relative to the ends of said second plates in the direction of gas flow, said first plurality of plates being arranged such that they are located in registration with the spacing between said second plurality of plates, and said second plurality of plates being arranged such that they are located in registration with the spacing between said first plurality of plates, whereby a tortuous gas flow path is defined and along said first and second plurality of plates; and refractory holding bricks (4) arranged at at least one side of said at least one pair of said first and second pairs of refractory supporting bricks and adjacent at least one end of at least one of said first and second pluralities of plates for holding said refractory supporting bricks and the ends of said plates in relative position.

5. The gas distributor of claim 4, wherein the distance between adjacent ones of said plates is from about 0.2 to about 10 millimeters.

* * * * *